April 30, 1935. H. D. HILL 1,999,693
FUEL PUMP VALVE FOR DIESEL ENGINES
Filed May 25, 1931
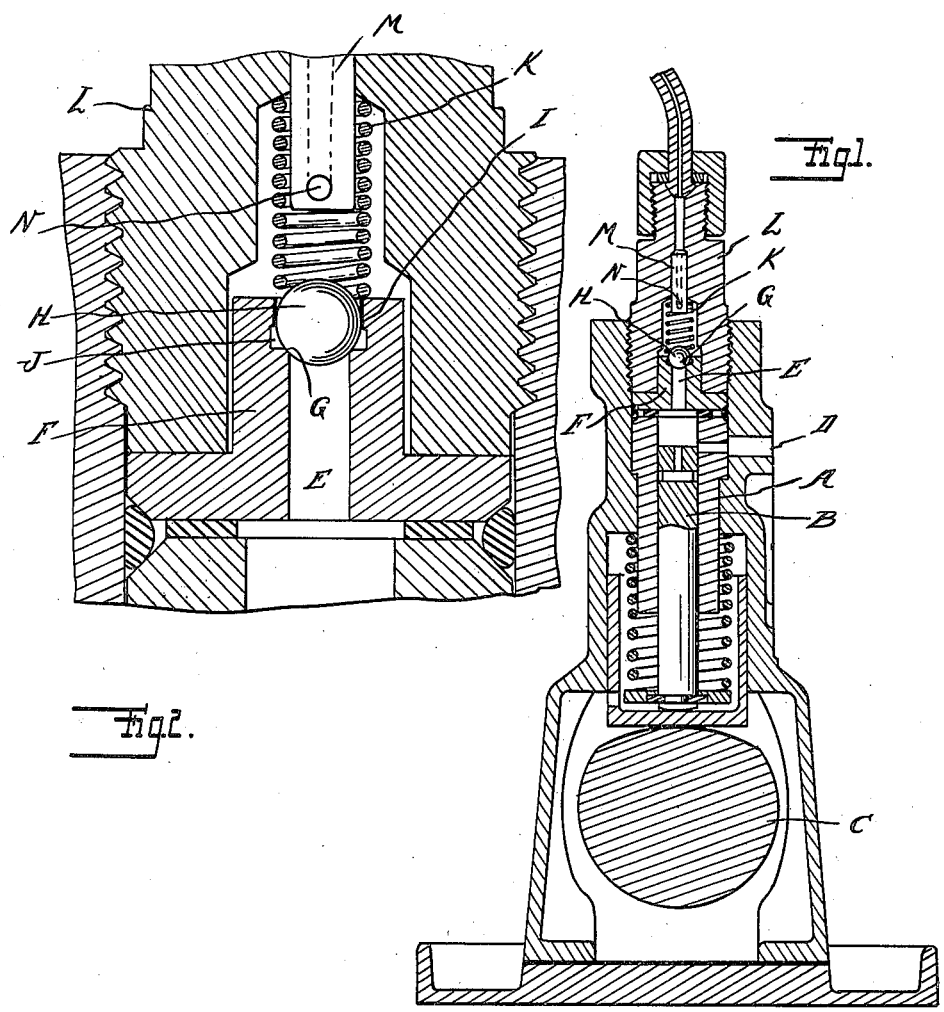
INVENTOR
Harry D. Hill
BY Whittemore Hulbert
Whittemore & Belknap
ATTORNEYS

UNITED STATES PATENT OFFICE 1,999,693

FUEL PUMP VALVE FOR DIESEL ENGINES

Harry D. Hill, Lansing, Mich., assignor to Hill-Diesel Engine Company, Lansing, Mich., a corporation of Michigan Application May 25, 1931, Serial No. 539,896

1 Claim. (Cl. 251—121)

The invention relates to fuel pumps for Diesel engines and has for its object the obtaining of an improved construction of check valve for retaining the pumped fluid. Heretofore ball check valves have been employed for this purpose but it has been found that frequently such valves will fail to hold the pressure due to the lodging of sediment upon some portion of the valve seat. Furthermore, in the operation of such a valve the ball is but slightly lifted from its seat so that any obstruction lodging on the seat may be retained in this position. It is therefore the object of the present invention to obtain a valve which is free from such defects and to this end the invention consists in the construction as hereinafter set forth.

In the drawing:

Figure 1 is a longitudinal section through a fuel pump for Diesel engines provided with my improved valve;

Figure 2 is an enlarged section through the valve.

The pump for the fuel may be of any suitable construction, but as shown A is the pump barrel, B a plunger movable in said barrel, C a cam for actuating the plunger, D the inlet port of the barrel and E the outlet port therefor. The outlet port E is formed in the valve seat member F which is provided with the usual conical annular seat G for the ball H. The member F is further provided with an outward extension which has a cylindrical portion I that is of a diameter closely fitting the diameter of the ball with only sufficient clearance to insure freedom of movement of the latter. This cylindrical portion extends above the seat a distance beyond the center of the ball and between the cylindrical portion of the seat there is an enlarged annular recess J. K is a coil spring of a diameter less than the diameter of the ball, one end of said spring bearing upon the ball and the opposite end against an abutment in a member L which is recessed to receive the spring. A pin member M serves to guide the spring and this member is hollow and provided with a lateral port N through which the pumped liquid fuel is ejected to pass to the engine.

With the construction as described, whenever the plunger B is actuated in an upward direction it will first close the inlet port D and then displace the fluid in the barrel above this port. The fluid thus displaced will lift the ball H from its seat but by reason of the fact that the ball quite closely fits the cylindrical port I of the member F there is no escape for the fluid until the ball is moved further upward. This will withdraw the ball sufficiently from its seat so that any sediment that may have lodged thereon will probably be displaced by the flow of fluid. Upon the reverse stroke of the plunger the lifting pressure is relieved whereupon the spring K will return the ball to its seat. The distance traveled by the ball in reseating is sufficient to impart considerable velocity so that the blow of the ball upon the seat will disintegrate any substance that may still be lodged thereon. Also the annular recess J which extends above the seat to near the equator of the ball in seated position, provides a sediment chamber and full hydrostatic pressure on the complete hemisphere of the ball when the latter rises from its seat.

My improved construction can be manufactured at low cost for a commercial ball such as used for ball bearings can be employed for the valve and the cylindrical bearing surrounding the ball may be formed simultaneously with the forming of the valve seat.

What I claim as my invention is:

A check valve for liquid fuel pumps comprising a ball valve, a member in which said valve is seated having a cylindrical portion extending above the valve seat to a height greater than the center of the ball when seated, said cylindrical portion closely fitting said ball, said seat member having an annular recess between the seat portion and said cylindrical portion and the upper end of said cylinder being in a plane perpendicular to the direction of rise of the ball.

HARRY D. HILL.